Sept. 8, 1936.  E. D. EBY  2,053,947

CONDENSER

Filed June 30, 1934

Inventor:
Eugene D. Eby,
by Harry E. Dunham
His Attorney.

Patented Sept. 8, 1936

2,053,947

UNITED STATES PATENT OFFICE 2,053,947

CONDENSER

Eugene D. Eby, Pittsfield, Mass., assignor to General Electric Company, a corporation of New York Application June 30, 1934, Serial No. 733,177

3 Claims. (Cl. 175—41)

My invention relates to condensers and more particularly to high voltage condensers adapted for use in coupling high voltage circuits to carrier current telephone circuits, voltage measuring circuits, synchronizing circuits and other forms of local circuits of comparatively low voltage. Condensers of this type are commonly built as standard units which may be connected in series and multiple as desired for use in connection with high voltages of different values. The general object of the invention is to provide an improved condenser construction of this general type.

Figure 1:
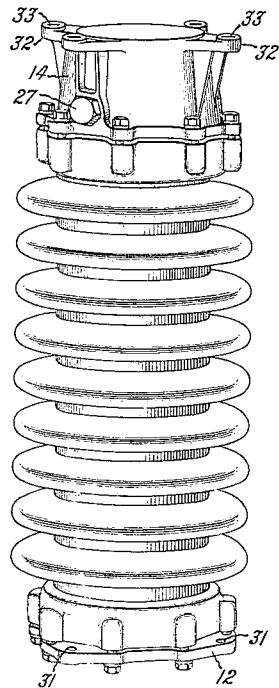
Figure 2:
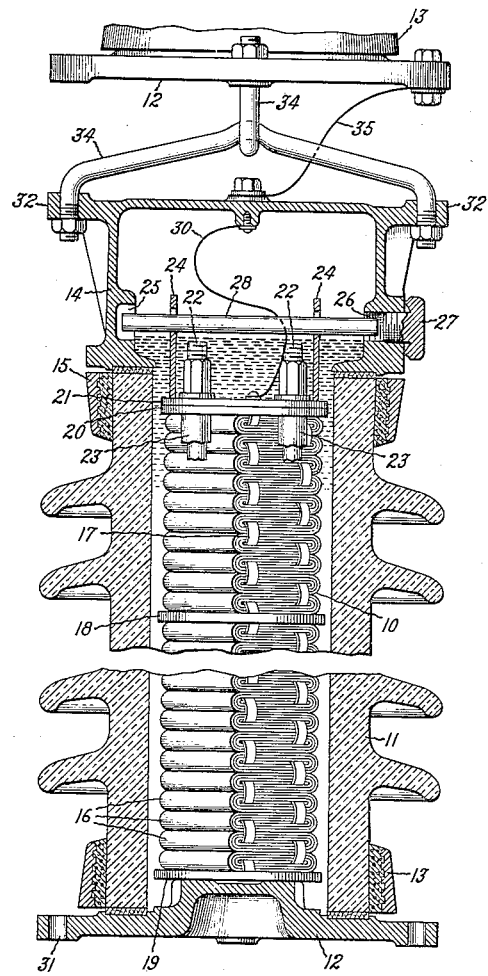
Figure 3:
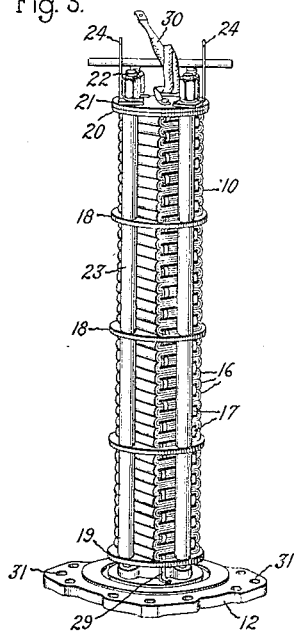

The invention will be better understood from the following description taken in connection with the accompanying drawing in which Fig. 1 is a perspective view of a complete condenser unit constructed in accordance with the invention; Fig. 2 is a sectional view of the condenser, this view also showing an improved arrangement for connecting two condenser units in series; and Fig. 3 is a perspective view of the condenser proper with its casing removed.

Like reference characters indicate similar parts in different figures of the drawing.

The complete condenser unit includes a vertical condenser element 10 surrounded by a hollow insulating porcelain shell 11. The insulating shell 11 is in the form of a vertical cylinder with its bottom closed by a metal plate 12 bolted to a metal clamping ring 13 cemented to the lower edge of the shell. The top of the shell 11 is closed by a hollow metal cap 14 bolted to a metal clamping ring 15 cemented to the upper edge of the shell. The condenser element 10 is formed of a stack of small paper condenser units 16 which may be formed by rolling strips of paper and metal foil into cylindrical form and then flattening the cylinders. The condenser units 16 are connected in series by connections 17. The stack of condenser units may be separated into several sections, separated by insulating plates 18. The metal base 12 has a raised central portion supporting an insulating end plate 19 upon which the condenser element 10 is supported. An insulating end plate 20 and a clamping plate 21 rest on top of the stack and are clamped to the base 12 by insulating rods 22 extending through the plates 21, 20, 18 and 19 and threaded into the raised central portion of the base as indicated in Fig. 3. Cylindrical or tubular insulating spacers 23 surrounding the bolts 22 serve to determine the spacing between the plates 18, 19 and 20 and thus to limit the compression of the several sections of the stack of condenser units 16. Two supports 24 secured to the clamping plate 21 extend up into the hollow cap 14 and have openings in alinement with an internal recess 25 at one side of the cap 14 and an opening 26 in its opposite side. The opening 26 is normally closed by a threaded plug 27. A supporting rod 28 may be inserted through the opening 26 and through the openings in the supports 24, this rod 28 being just long enough so that one end will project into the recess 25 and the other end into the opening 26 to secure the base 12 and condenser element 10 to the cap 14. The condenser element 10 is immersed in insulating liquid which may be introduced into the condenser casing through the opening 26 while the plug 27 is removed. The lower end of the condenser element 10 is connected to the metal base 12 by a terminal conductor 29 and the upper end of the condenser element is connected to the cap 14 by a terminal conductor 30.

The metal base 12 is provided with bolt holes 31 to permit it to be secured by bolts to a suitable support if desired. The cap 14 is provided with lugs 32 having bolt holes 33 spaced to aline with the bolt holes 31 of the base of another unit so that if desired two or more units may be bolted solidly together one above the other. Condensers of this type are, however, frequently suspended from overhead supports and flexible, mechanical connections between the condensers are often desirable. If desired, therefore, the two suspended units may be flexibly secured together by a pair of metal rods 34, as shown in Fig. 2. The ends of these rods are bent to enter the bolt holes 31 in the base of the upper condenser element and the bolt holes 33 in the lugs 32 of the lower condenser element respectively. The two condenser elements are connected in series by a conductor 35 when flexibly supported in the manner just described.

The stack of condenser units 16 is clamped securely to the base 12 by the clamping plate 21 and the insulating bolts 22. If the porcelain shell 11 of a suspended condenser is accidentally broken, then the base 12 and the condenser element 10 will be supported by the supports 24 and the rod 28 so that nothing can fall to the ground except possibly some of the insulating liquid which may escape. The invention thus provides a simple and effective means for supporting a suspended string or series of condensers even in the event of accidental breakage of one or more of their insulating casings.

The invention has been explained by describing and illustrating a particular condenser structure, but it will be apparent that changes may be made without departing from the spirit of the invention and the scope of the appended claims.

What I claim as new and desire to secure by Letters Patent of the United States, is,—

1. A condenser including a hollow insulating shell, a base closing the lower end of said shell, a cap closing the top of said shell, said cap having an opening, a vertical condenser element within said shell, means clamping the condenser element to the base, a support carried by said clamping means, and means for securing said support to the cap, said securing means being removable through said opening in the cap.

2. A condenser including a hollow insulating shell, a base closing the lower end of said shell, a hollow cap closing the top of said shell, said cap having an internal recess at one side and an opening through the other side, a vertical condenser element within said shell, means clamping the condenser element to the base, a support carried by said clamping means, and a rod extending through said support and engaging said recess and opening to support said base and condenser element upon breakage of the shell.

3. A condenser including a plurality of condenser units arranged in a stack between end plates, said stack being formed in sections, adjacent sections being separated by a plate, tubular insulating spacers between said plates, and insulating clamping rods connecting said end plates and extending through said separating plates and spacers for compressing said stack, said tubular spacers being arranged to limit the compression of each of said sections.

EUGENE D. EBY.